United States Patent
Aitzetmueller et al.

(10) Patent No.: US 7,361,111 B2
(45) Date of Patent: Apr. 22, 2008

(54) POWER BRANCHING TRANSMISSION FOR MOTOR VEHICLES

(75) Inventors: Heinz Aitzetmueller, St. Konrad (AT); Reinhard Flachs, Wilhering (AT); Johann Paul Hofer, Gerolzhofen (AT); Markus Hofer, Garsten (AT); Dieter Stoeckl, Steyr (AT)

(73) Assignee: Hofer Forschungs und Entwicklungs & Co. KG, Steyr (AT)

( * ) Notice: Subject to any disclaimer, the term of this patent is extended or adjusted under 35 U.S.C. 154(b) by 172 days.

(21) Appl. No.: 11/199,179

(22) Filed: Aug. 9, 2005

(65) Prior Publication Data

US 2006/0032321 A1 Feb. 16, 2006

(30) Foreign Application Priority Data

Aug. 10, 2004 (AT) ............................ A 1360/2004

(51) Int. Cl.
*F16H 47/04* (2006.01)
*F16H 3/08* (2006.01)

(52) U.S. Cl. ......................................... 475/83; 74/330
(58) Field of Classification Search ................. 74/329, 74/330, 331; 475/72, 73, 76, 78, 80, 83
See application file for complete search history.

(56) References Cited

U.S. PATENT DOCUMENTS

| | | | | |
|---|---|---|---|---|
| 2,962,915 A | * | 12/1960 | Wiggermann | 475/82 |
| 3,212,358 A | * | 10/1965 | De Lalio | 477/69 |
| 3,580,107 A | * | 5/1971 | Orshansky, Jr. | 475/78 |
| 4,825,722 A | * | 5/1989 | Hagin et al. | 475/80 |
| 5,222,921 A | * | 6/1993 | Garcia | 475/72 |
| 5,890,981 A | * | 4/1999 | Coutant et al. | 475/72 |
| 5,931,758 A | * | 8/1999 | Walter | 475/72 |
| 6,203,463 B1 | * | 3/2001 | Casey et al. | 475/72 |
| 6,361,463 B1 | * | 3/2002 | Kojima | 475/79 |
| 2006/0130601 A1 | * | 6/2006 | Hughes | 74/340 |

* cited by examiner

*Primary Examiner*—Tisha Lewis
(74) *Attorney, Agent, or Firm*—Crowell & Moring LLP

(57) ABSTRACT

A power branching transmission suitable for motor vehicles having an internal-combustion engine which drives an input shaft of the power branching transmission has several branches comprising at least one power shift transmission with a number of gears and has an output shaft. For the comprehensive optimization of the power branching transmission, at least one of the branches is equipped with a control device by means of which, during the starting operation of the motor vehicle, the rotating direction of the output shaft can be changed, and during the starting operation and with shifted gears of the power shift transmission connected with the input shaft, by way of the control device, the rotational speed of the output shaft can be continuously influenced.

13 Claims, 3 Drawing Sheets

POWER BRANCHING TRANSMISSION FOR MOTOR VEHICLES

BACKGROUND AND SUMMARY OF THE INVENTION

This application claims the priority of Austrian patent document 2 A A 1360/2004, filed Aug. 10, 2004, the disclosure of which is expressly incorporated by reference herein.

The invention relates to a power branching transmission for motor vehicles having an internal-combustion engine which drives an input shaft of the power branching transmission, which power branching transmission has several branches comprising at least one power shift transmission with a number of gears and has an output shaft.

A hydromechanical transmission is known from U.S. Patent Document U.S. Pat. No. 3,979,972, which is constructed in the manner of a power branching transmission and comprises an input shaft connected with an internal-combustion engine and an output shaft. In this case, clutches and planetary transmissions are provided in a first branch between the input shaft and the output shaft; whereas a hydrostatic drive operates in a second branch, which hydrostatic drive is in an operative connection with spur gears and has two pump motors situated behind one another.

German Patent Document DE 199 54 894 A1 to a power branching transmission which is suitable for tractors, wheel- and chain-driven machine tools and utility motor vehicles. The power branching transmission has a mechanical branch, a hydrostatic branch and one or more planetary transmissions by way of which the mechanical power fraction and the hydrostatic power fraction are combined again.

German Patent Document DE 101 28 853 A1 (corresponding U.S. Patent Publication No. US2005/157583) discloses a motor vehicle which has a transmission line with a drive unit, a transmission and a clutch device for the transmission of torques between the drive unit and the transmission. The clutch device is constructed as a multiple clutch device, particularly as a double clutch device, with a first clutch arrangement assigned to a first transmission input shaft and a second clutch arrangement assigned to a second transmission input shaft.

According to German Patent Document DE 101 28 853 A1, a transmission line with an internal-combustion engine is installed into a motor vehicle, which internal-combustion engine interacts with a double clutch transmission or a power shift transmission. Between the internal-combustion engine and the projecting transmission, a double clutch is provided from which an input shaft extends to the above-mentioned transmission. An output shaft driving the wheels of a rear axle is provided on a countershaft of the transmission.

It is an object of the invention to provide a highly effective power shift transmission for motor vehicles which offers multiple application possibilities and is distinguished by a simple transmission construction.

According to certain preferred embodiments of the invention, this object is achieved by providing a power branching transmission for motor vehicles having an internal combustion engine driven transmission input shaft, said power branching transmission comprising a plurality of transmission branches including a power shift transmission with a plurality of gears and an output shaft, wherein at least one of the branches is equipped with a control device operable to change rotational directions of the output shaft during starting operation of the motor vehicle, and wherein the control device is operable to continuously influence the rotational speed of the output shaft with shifted gears of the power shaft transmission connected with the input shaft.

This object is further achieved by providing a method of operating a power branching transmission for motor vehicles, having an internal-combustion engine which drives an input shaft of the power branching transmission, which power branching transmission has several branches comprising at least one power shift transmission with a number of gears and has an output shaft wherein at least one of the branches controls the power branching transmission in such a manner that, during the starting operation of the motor vehicle, the rotating direction of the output shaft can be changed, and during the starting operation and with the shifted gears of the power shift transmission connected with the input shaft, the rotational speed of the output shaft can be continuously influenced.

Important advantages achieved by means of the invention are that a continuously operating, easily producible power branching transmission is conceived which operates with a change of the transmission ratio, which does not interrupt the tractive power, from a maximal speed when reversing to the maximal speed when driving forward, in which case a start from a stopped condition is permitted. In this case, a precise positioning and maneuvering of the motor vehicle is ensured by the control drive, preferably the hydrostatic device. The size of the hydrostatic device can also primarily be determined by the required tractive powers and the permissible differential pressure of the hydrostatic device. As a result of the ratios in the compound planetary transmission, it becomes possible to keep the displacement volume in the fixed-displacement motor of the hydrostatic device relatively low. Furthermore, a perfect transmission efficiency is achieved, specifically by low hydrostatic power fractions, particularly at higher gears and higher speeds. In addition, required transmission spreads can be achieved with an arbitrary number of mechanical gear ratio positions. Finally, a retarder function can also be implemented in connection with the hydrostatic device. Furthermore, the power branching transmission is suitable for machine tools—tractors, construction machines, handling vehicles, telehandlers, stackers—and vehicles for the stop-and-go operation—city buses, feeding vehicles, street cleansing vehicles. Finally, the above-mentioned transmission can be used in passenger cars and utility vehicles, where special demands are made with respect to driving and operating comfort.

Other objects, advantages and novel features of the present invention will become apparent from the following detailed description of the invention when considered in conjunction with the accompanying drawings.

DETAILED DESCRIPTION OF THE DRAWINGS

Figure 1:
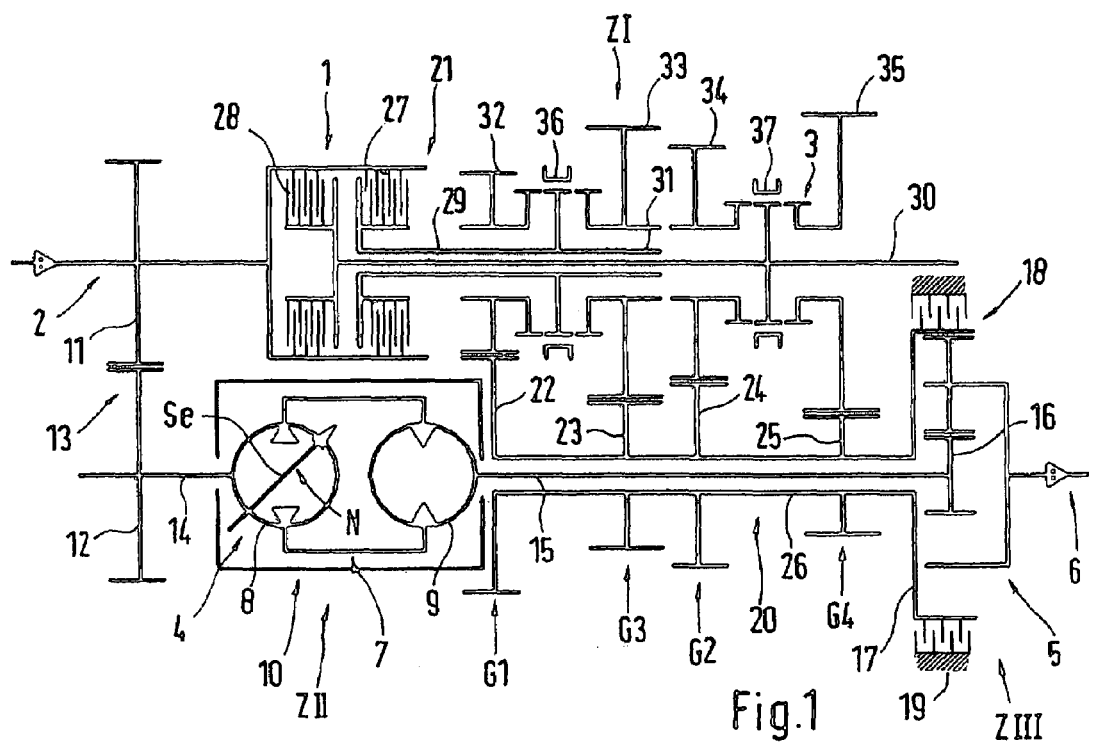
FIG. 1 is a schematic longitudinal sectional view of a first embodiment of a power branching transmission.

A motor vehicle, which is not shown in detail, such as a machine tool tractor, a construction machine, a handling vehicle, a telehandler, a stacker, or a vehicle acting, for example, in the stop-and-go operation such as a city bus, a feeding vehicle, or a street cleansing vehicle, has a power branching transmission 1 with an input shaft 2 driven by an internal-combustion engine. The power branching transmission 1 is equipped with several branches ZI, ZII and ZIII, of which the first branch ZI has a power shift transmission 3 comprising four gear positions G1, G2, G3 and G4 depicted in FIG. 1. The second branch ZII is constructed as a control device 4 which, by means of a transmission unit constructed as a compound planetary transmission, which forms the third branch ZIII, cooperates with an output shaft 6.

The control device 4 is constructed in such a manner that, during the starting operation of the motor vehicle, on the one hand, the rotating direction of the output shaft 6 for forward driving can be changed to reversing driving. On the other hand, during the starting operation and with shifted gears G1, G2, G3 and G4, the output shaft can be adjusted continuously. The control device 4 is formed by a hydrostatic device 7 in the illustrated preferred embodiments of the invention. An electric motor is also contemplated for use as the control device 4 in other preferred embodiments of the invention.

The hydrostatic device 7 has a variable-displacement pump 8 having a control device Se and a fixed-displacement motor 9 (in the case of defined demands, the fixed-displacement motor may be a variable-displacement motor). The pump, motor and control device can be combined to form a compact constructional unit which is easy to mount. The variable-displacement pump 8 is driven by a spur gear system 13 which comprises two gear wheels 11 and 12 and cooperates with the input shaft 2. In this case, the gear wheel 11 is connected with the input shaft 2, and the gear wheel 12 is connected with a first shaft 14 of the variable-displacement pump 8.

The fixed-displacement motor 9 of the hydrostatic device 7, by way of a second shaft 15, drives a sun gear 16 of the compound planetary transmission 5 comprising three shafts. A ring gear 17 of the compound planetary transmission 5 interacts with a power-shiftable ring gear clutch 18 which is fastened to a housing 19. The ring gear 17 is connected with a countershaft 20 of the power shift transmission 3 constructed in the manner of a double clutch transmission 21, which countershaft 20 carries gear wheels 22, 23, 24 and 25 for speeds G1, G2, G3 and G4. The countershaft 20 is constructed as a hollow shaft 26 in which the second shaft 15 is situated. This second shaft 15 extends between the fixed-displacement motor 9 and the sun gear 16 of the compound planetary transmission 5.

The input shaft 2 of the power branching transmission 1 interacts by means of a first clutch 27 and a second clutch 28 of the double clutch transmission 21. Of these, the first power-shiftable clutch 27 is coupled with a first gear shaft 29, and the second power-shiftable shifting clutch 28 is coupled with a second gear shaft 30. For a constructive simplification, the first gear shaft 29 is constructed as a hollow shaft 31 which surrounds the second gear shaft 30 at least in sections. Loose wheels 32, 33, 34 and 35 are disposed on the first gear shaft 29 and the second gear shaft 30. The loose wheels 32 and 33 for speeds G1 and G3 are disposed on the first gear shaft 29. The loose wheels 34 and 35 for speeds G2 and G4 are disposed on the second gear shaft 30. Between the loose wheels 32 and 33 as well as the loose wheels 34 and 35 respectively, synchronizing devices 36 and 37 are provided which become operative when the speeds G1, G2, G3 and G4 are connected. The synchronizing devices 36 and 37 can be replaced by correspondingly constructed clutches.

During the starting operation of the internal-combustion engine acting upon the power branching transmission 1 and operating at a constant rotational speed, the first clutch 27 and the second clutch 28 of the double clutch transmission 21 are opened; likewise the ring gear clutch. By way of the spur gear system 13, the variable-displacement pump 8 of the hydrostatic device 7 is driven corresponding to the rotational speed of the internal-combustion engine. The control device Se of the variable-displacement pump 8 is set to a pivoting angle marked N (=0); no delivery of hydraulic medium takes place to the fixed-displacement motor 9. The second shaft of the fixed-displacement motor 9 stands still or has the rotational speed 0. By closing the ring gear clutch 18, the ring gear 17 at the compound planetary transmission 5 is connected with the housing 19 and the power flux between the internal-combustion engine and the wheels of the motor vehicle is closed. In this case, the rotational speed and the rotating direction of the output shaft 6 are determined solely by the rotational speed and the rotating direction of the sun gear 16 of the compound planetary transmission 5. Under the influence of the change of the delivered oil volume of the variable-displacement pump 8 by the adjustment of the swiveling angle of the control device Se, the fixed-displacement motor 9 is supplied with hydraulic medium, which fixed-displacement motor 9 drives the sun gear 16. From the stopped condition of the motor vehicle—initial value of the starting operation—the above-mentioned motor vehicle is driven purely hydrostatically. As a result of the hydrostatic device 7, it becomes possible to operate the motor vehicle in both driving directions—forward drive and reverse drive—as a function of the selected transmission ratios of the compound planetary transmission 5 and the rotational speed design of the hydrostatic device 7.

After the starting operation by way of the hydrostatic device, a change-over operation takes place into the first gear position G1, by way of the synchronizing device 36, the loose wheel being non-rotatably connected with the first gear shaft 29. In this operating condition, the ring gear clutch 19 is opened, and the first shifting clutch 27 is closed in an overlapping manner. As a result, the ring gear 17 of the compound planetary transmission 5 is connected with the first gear shaft 29 and a defined rotational speed is reached. During this change-over operation, as a result of an adaptive adjustment of the pivoting angle of the control device Se of the variable-displacement pump 8, the rotational speed and the rotating direction of the fixed-displacement motor 9 is permanently adapted to the rotational speed change of the ring gear 17; specifically with the result that, after the termination of the change-over operation, a total transmission ratio is present which is comparable to that occurring during the drive by way of the hydrostatic device 7. In this operating condition, the sun gear 16 rotates in the opposite direction to the ring gear 17. It should be mentioned here that, by changing the rotational speed of the sun gear 16 from a rotation against the rotating direction of the ring gear 17 and in the same direction of the sun gear 16, specifically in each case up to the maximal rotational speed, the ratio of the power shift transmission 1 can be continuously adjusted.

After reaching the maximal speed in the first gear position G1, the ring gear 17 rotates corresponding to the transmission ratio selected in the double clutch transmission 21 and the sun gear 16 rotates in the same direction as the ring gear 17 at a correspondingly high rotational speed, and the change-over operation takes place into the next higher gear position in the following sequence:

- Start of synchronization of the next gear—G2, G3, G4—by actuating the synchronizing devices 36 and 37 on one of the no-load first or second gear shafts 29 or 30;
- shifting from one of the gear shafts—29 or 30—to the other gear shaft—20 or 30—by the overlapping opening and closing of the clutches—27 or 28—and the simultaneous adaptation of the rotational speed of the fixed-displacement motor 9, so that approximately the same ratio as before the change-over operation exists again at the end of the change-over operation;
- after the change-over operation has been implemented, the change of the transmission ratio takes place by changing the rotational speed of the fixed-displacement motor 9.

The shifting of possible additional higher gears or the shifting of lower gears takes place analogously.

Figure 2:
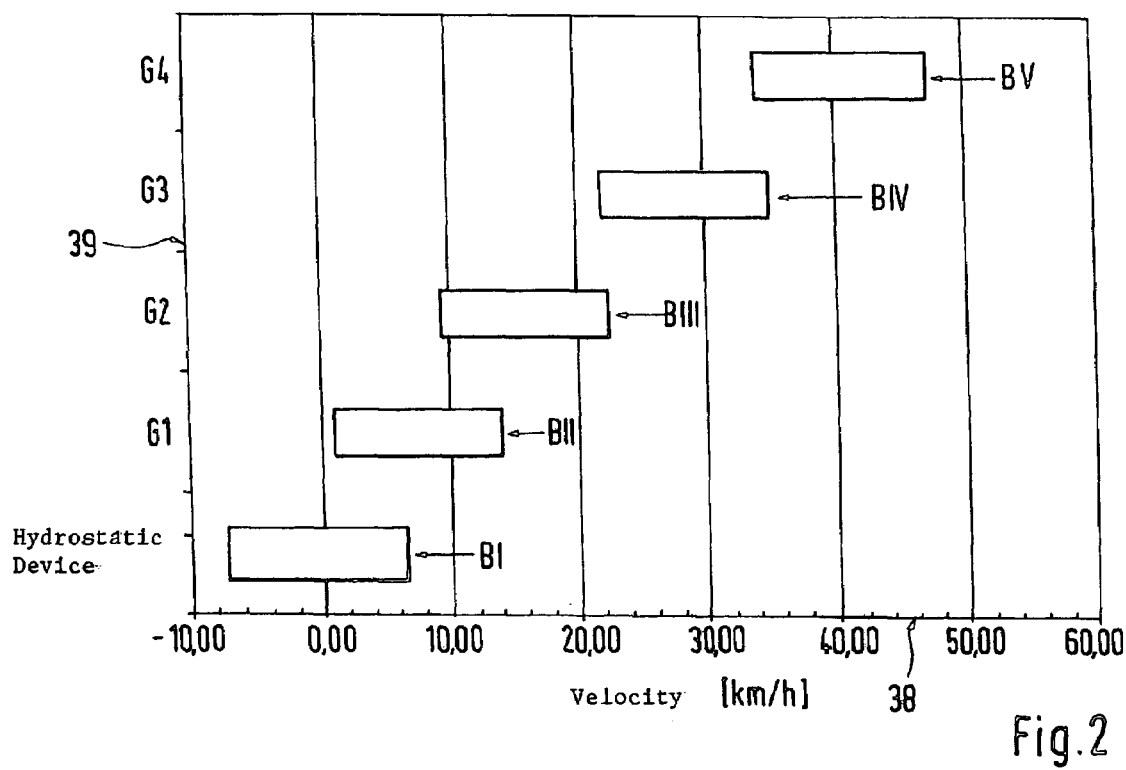
FIG. 2 is a speed diagram for the power branching transmission according to FIG. 1.

FIG. 2 is a speed diagram of the power branching transmission 1. On the abscissa 38, the speed is entered in km/h (kilometer per hour), and on the ordinate 39, the function of the hydrostatic drive 7 is entered alone and at the shifted speeds G1, G2, G3 and G4 respectively. Accordingly, during the starting operation of the motor vehicle, the hydrostatic device 7 alone is continuously operative for the forward drive and the reverse drive in the range of from 0 km/h to in each case approximately 8 km/h—horizontal bar BI—. Beyond that, the hydrostatic device 7 operates in the gears G1, G2, G3 and G4 in speed ranges according to the horizontal bars BII, III, BIV and BV; that is: G1, from 2 to 16 km/h; G2, from 12 to 26 km/h; G3, from 22 to 36 km/h; and G4, from 34 to 48 km/h.

Figure 3:
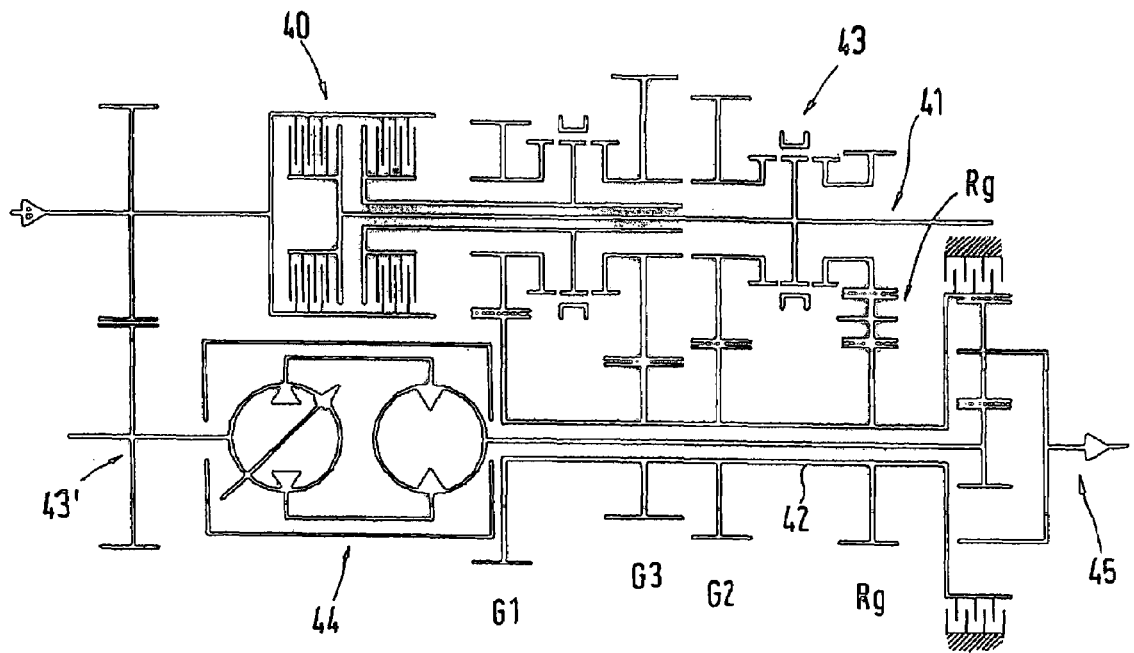
FIG. 3 is a view corresponding to FIG. 1 of a second embodiment of a power branching transmission.
Figure 4:
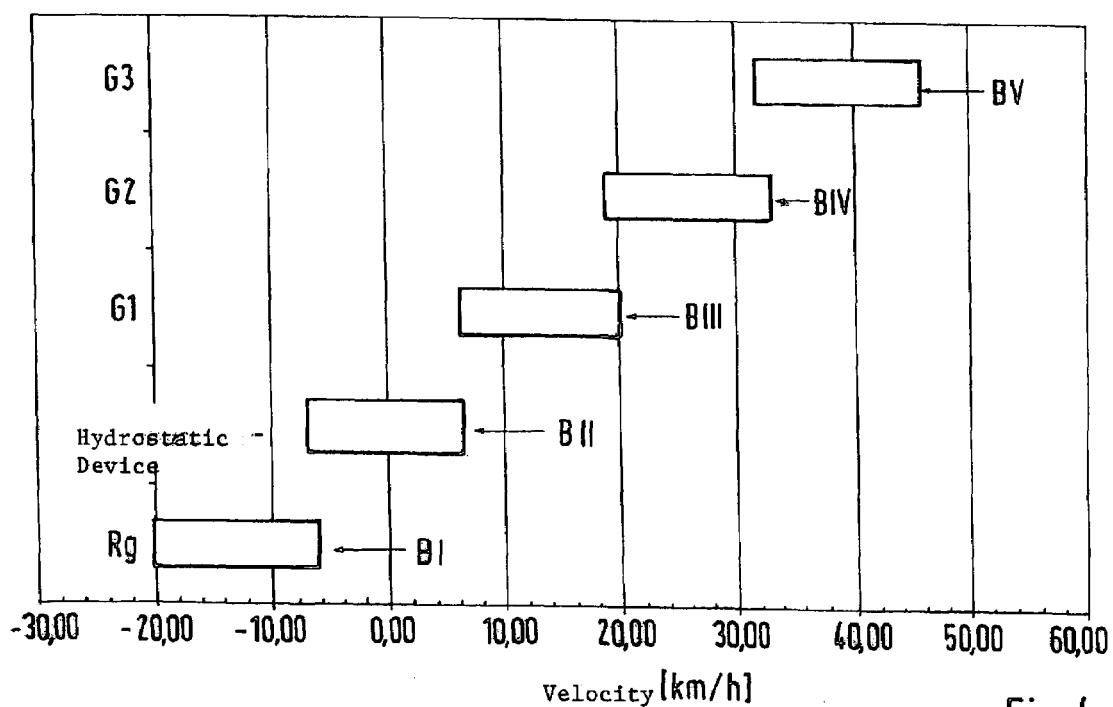
FIG. 4 is a speed diagram for the power branching transmission according to FIG. 3.

According to FIG. 3, a power branching transmission 40, in principle, has the same construction as the power branching transmission 1 according to FIG. 1. However, the power branching transmission 40 is provided with three speeds G1, G2 and G3 and a mechanical reverse gear Rg, which is arranged between a second gear shaft 41 and a countershaft 42 of a double clutch transmission 43; a hydrostatic device has the reference number 44 and an output shaft has the reference number 45. The diagram according to FIG. 4, which is similar to the diagram of FIG. 2, indicates that, in the connected reverse gear Rg, speeds of from 8 to 20 km/h can be achieved by means of the hydrostatic device 44—bar BI—. During a pure operation with the hydrostatic drive 45, which is illustrated by the bar BII, during the starting operation, speeds of from 0 to 8 km/h are reached, specifically in the forward drive and when reversing. The speed ranges for the gears G1, G2 and G3 are indicated by the bars BIII, BIV and BV.

Figure 5:
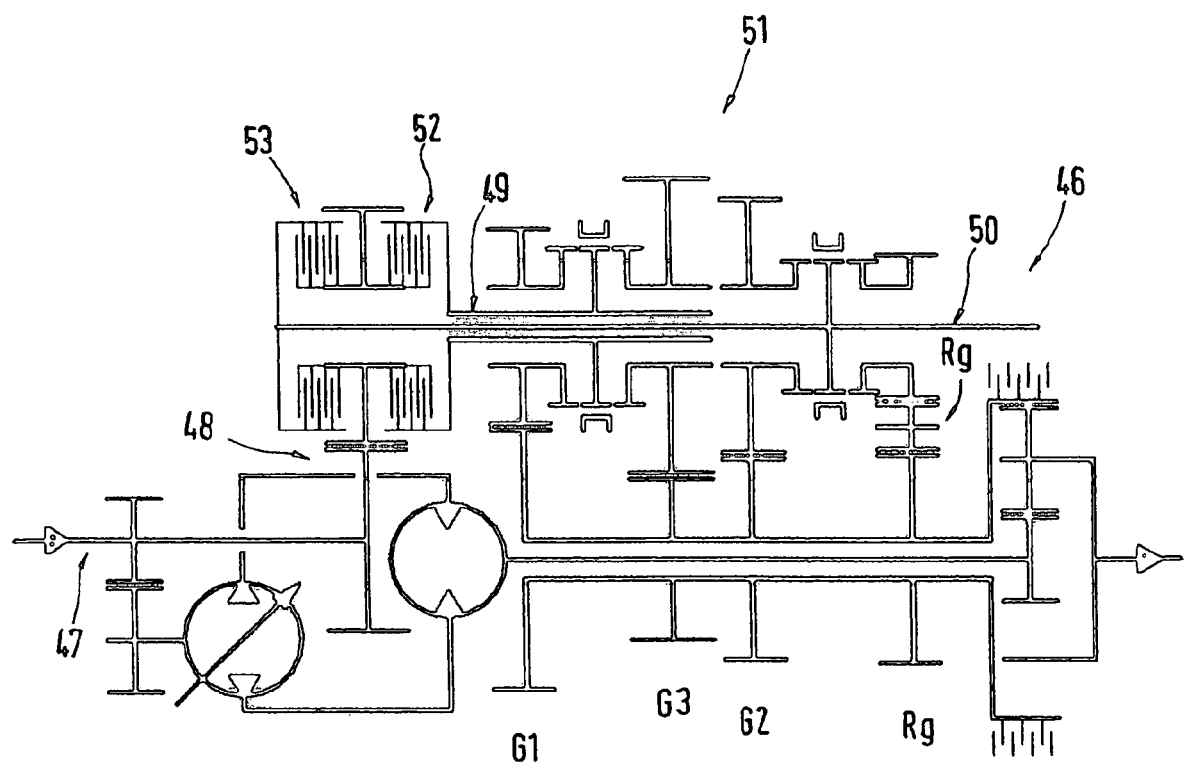
FIG. 5 is a view corresponding to FIG. 1 of a third embodiment of a power branching transmission.

The embodiment of a power branching transmission 46 illustrated in FIG. 5 has a drive shaft 47 which, by way of a spur gear system 48, is in an operative connection with a first gear shaft 49 and a second gear shaft 50 of a double clutch transmission 51. Finally, the double clutch transmission 51 comprises a first clutch 52 and a second clutch 53 which cooperate with the first gear shaft 49 and the second gear shaft 50 respectively.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Power branching transmission for motor vehicles comprising an internal-combustion engine driven transmission input shaft, a plurality of transmission branches, and an output, wherein
   a first of the transmission branches has a power shift transmission and a double-clutch transmission connected directly to the input shaft, a second of the transmission branches has a hydrostatic device associated with the input shaft through a gear shaft through a gear set and operable to change rotational directions of the output shaft during starting operation of the motor vehicle, and a third of the transmission branches has a compound planetary gear which has a sun gear connected with the hydrostatic transmission device and a ring gear fixed to a transmission housing, such that the control device is operable to continuously influence the rotational speed of the output shaft with the shifted gears of the power shift transmission connected with the input shaft.

2. Power branching transmission according to claim 1, wherein the hydrostatic device has a variable-displacement pump and a fixed-displacement motor.

3. Power branching transmission according to claim 2, wherein the variable-displacement pump and the fixed-displacement motor of the hydrostatic device are combined to form a constructional unit.

4. Power branching transmission according to claim 2, wherein the variable-displacement pump of the hydrostatic device cooperates with the input shaft via the gear system.

5. Power branching transmission according to claim 2, wherein the fixed-displacement motor of the hydrostatic device drives the sun gear of the compound planetary transmission via a shaft.

6. Power branching transmission according to claim 1, wherein the compound planetary transmission comprises three shafts.

7. Power branching transmission according to claim 1, wherein the ring gear of the compound planetary transmission is operatively connected with a countershaft of the power shift transmission.

8. Power branching transmission according claim 7, wherein the countershaft of the power shift transmission is a hollow shaft.

9. Power branching transmission according to claim 1, wherein a first clutch of the double-shaft transmission is coupled with a first gear shaft, and a second clutch of the double-clutch transmission is coupled with a second gear shaft with loose wheels being operatively disposed on the first and second gear shafts.

10. Power branching transmission according to claim 9, wherein the first gear shaft is a hollow shaft which surrounds the second gear shaft.

11. Power branching transmission according to claim 9, wherein the first and second gear shafts are provided with synchronizing devices for the loose wheels.

12. Power branching transmission according to claim 9, wherein the first and second gear shafts are provided with power-shiftable clutches for the loose wheels.

13. Power branching transmission according to claim 9, wherein a reverse gear is operatively arranged between at least the second gear shaft and a countershaft of the power shift transmission for reversing the rotating direction of the countershaft.

* * * * *

UNITED STATES PATENT AND TRADEMARK OFFICE
CERTIFICATE OF CORRECTION

PATENT NO. : 7,361,111 B2
APPLICATION NO. : 11/199179
DATED : April 22, 2008
INVENTOR(S) : Aitzetmeuller et al.

It is certified that error appears in the above-identified patent and that said Letters Patent is hereby corrected as shown below:

On the Title Page, Item (73) should read,

Hofer Forschungs und Entwicklungs GmbH & Co., KG, Steyr (AT)

Signed and Sealed this

Eighteenth Day of August, 2009

David J. Kappos
*Director of the United States Patent and Trademark Office*